(12) United States Patent
Bandholz et al.

(10) Patent No.: US 8,469,273 B2
(45) Date of Patent: Jun. 25, 2013

(54) LABEL-CONTROLLED SYSTEM CONFIGURATION

(75) Inventors: Justin P. Bandholz, Cary, NC (US); William G. Pagan, Durham, NC (US); William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/528,048

(22) Filed: Jun. 20, 2012

(65) Prior Publication Data

US 2012/0255993 A1  Oct. 11, 2012

Related U.S. Application Data

(63) Continuation of application No. 12/644,226, filed on Dec. 22, 2009.

(51) Int. Cl.
*G06K 7/14* (2006.01)
*G06K 7/10* (2006.01)
(52) U.S. Cl.
CPC ................................ *G06K 7/10722* (2013.01)
USPC .......................................... 235/454; 235/474

(58) Field of Classification Search
USPC ..................... 235/454, 474, 462.01; 358/406, 358/474, 497
See application file for complete search history.

(56) References Cited

U.S. PATENT DOCUMENTS

| | | | |
|---|---|---|---|
| 4,752,874 A | 6/1988 | Meyers | |
| 5,504,315 A | 4/1996 | Hardesty et al. | |
| 5,886,875 A | 3/1999 | Phelps, III et al. | |
| 6,669,085 B1 * | 12/2003 | Bergen | 235/375 |
| 6,672,510 B2 | 1/2004 | Sauve | |
| 7,104,456 B2 | 9/2006 | Parker et al. | |
| 7,156,307 B2 * | 1/2007 | Stadelmann et al. | 235/454 |
| 7,212,312 B2 * | 5/2007 | Motamed | 358/1.9 |
| 7,312,984 B2 | 12/2007 | Richardson et al. | |
| 7,405,847 B2 * | 7/2008 | Short et al. | 358/474 |
| 7,502,842 B2 * | 3/2009 | Graham et al. | 709/223 |
| 2005/0041385 A1 | 2/2005 | Kikinis et al. | |
| 2006/0285126 A1 * | 12/2006 | Braswell et al. | 358/1.1 |
| 2007/0103725 A1 | 5/2007 | Kawahara et al. | |

* cited by examiner

*Primary Examiner* — Ahshik Kim
(74) *Attorney, Agent, or Firm* — Law Office of Jim Boice

(57) ABSTRACT

A system has an optical scanner for reading a printed system configuration code on a printed configuration label. The printed system configuration code includes configuration information that describes a bus speed of a system bus of the system. A processor dynamically configures the system according to the configuration information decoded from the printed system configuration code.

19 Claims, 3 Drawing Sheets

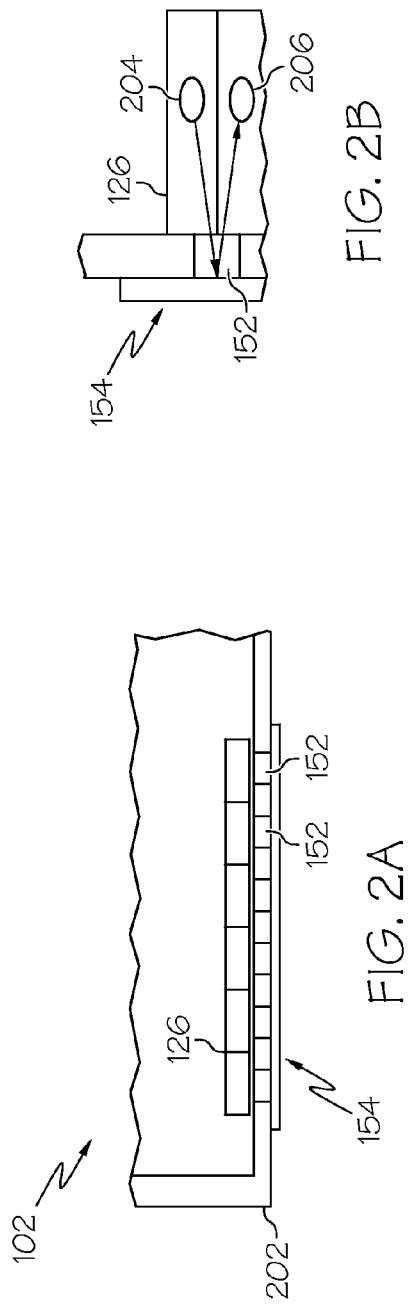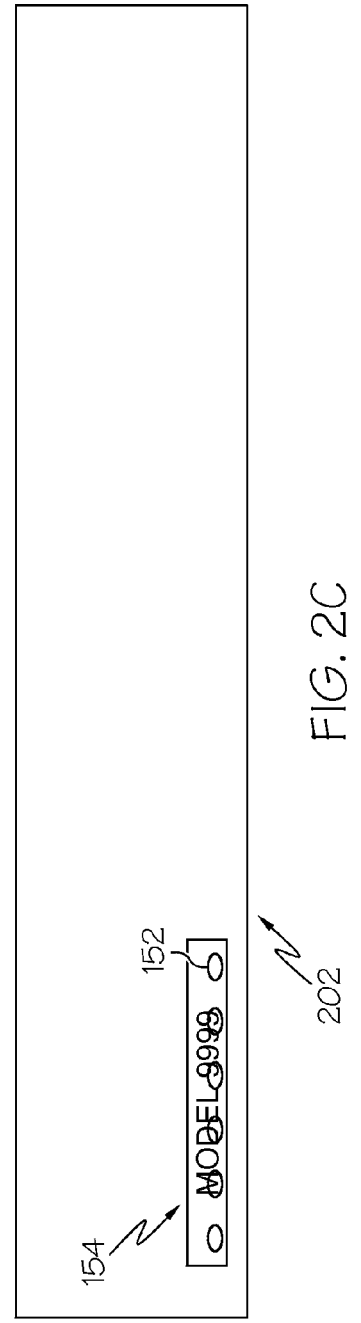

LABEL-CONTROLLED SYSTEM CONFIGURATION

The present application is a continuation of U.S. patent application Ser. No. 12/644,226, filed on Dec. 22, 2009, and entitled, "Label-Controlled System Configuration," which is incorporated herein by reference.

BACKGROUND

The present disclosure relates to the field of computers, and specifically to the configuration of computers. Still more particularly, the present disclosure relates to dynamically configuring computers.

SUMMARY

One embodiment of the present disclosure comprises: an optical scanner for reading a printed system configuration code; a printed configuration label comprising the printed system configuration code, wherein the printed system configuration code describes a system configuration of the system, and wherein the system configuration comprises a bus speed of a system bus of the system; and a processor for dynamically configuring the system according to configuration information decoded from the printed system configuration code.

One embodiment of the present disclosure comprises: an optical scanner for reading a printed system configuration code; a printed configuration label comprising the printed system configuration code, wherein the printed system configuration code describes a system configuration of the system, and wherein the system configuration comprises a bus speed of an input/output (I/O) bus of the system; and a processor for dynamically configuring the system according to configuration information decoded from the printed system configuration code.

One embodiment of the present disclosure comprises: an optical scanner for reading a printed system configuration code; a printed configuration label comprising the printed system configuration code, wherein the printed system configuration code describes a system configuration of the system, and, wherein the system configuration comprises a network port setting of the system; and a processor for dynamically configuring the system according to configuration information decoded from the printed system configuration code.

One embodiment of the present disclosure comprises: an optical scanner for reading a printed system configuration code; a printed configuration label comprising the printed system configuration code, wherein the printed system configuration code describes a system configuration of the system, and wherein the system configuration comprises an enablement setting of an input/output (I/O) card of the system; and a processor for dynamically configuring the system according to configuration information decoded from the printed system configuration code.

BRIEF DESCRIPTION OF THE SEVERAL VIEWS OF THE DRAWINGS

FIGS. 2A-C illustrate an exemplary label scanning system used to dynamically configure a computer system, such as that shown in FIG. 1.

DETAILED DESCRIPTION

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
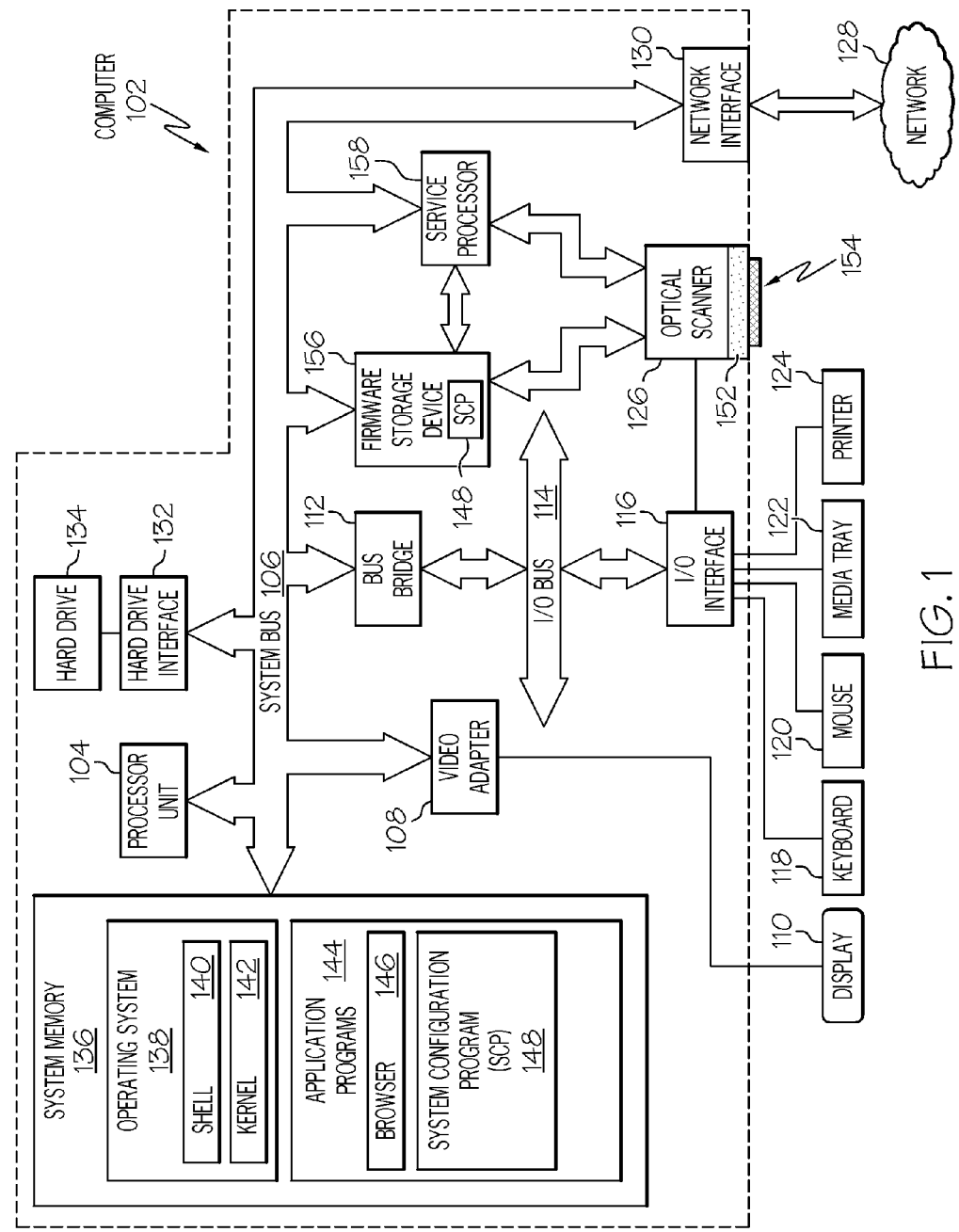
FIG. 1 depicts an exemplary computer that may be used in implementing the present disclosure.

With reference now to the figures, and in particular to FIG. 1, there is depicted a block diagram of an exemplary computer 102, which may be utilized by the present disclosure. Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and an optical scanner 126. In one embodiment, optical scanner 126 is adjacent to, or actually abuts, a viewing window 152, allowing optical access to a printed configuration label 154. While described below as a series of openings, alternatively viewing window 152 may be a transparent or translucent material, a mesh material, or any other type of opening that is optically unobstructed to optical scanner 126. Additional details of a preferred embodiment of optical scanner 126 are presented below. Note that optical scanner 126 is not a traditional scanner designed to capture an image, but rather is designed to simply detect a simple pattern of marks made on the printed configuration label 154. While the format of the ports connected to I/O interface 116 may be any known to those skilled in the art of computer architecture, in a preferred embodiment some or all of these ports are universal serial bus (USB) ports.

As depicted, in one embodiment, computer 102 is optionally able to communicate via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Figure 3:
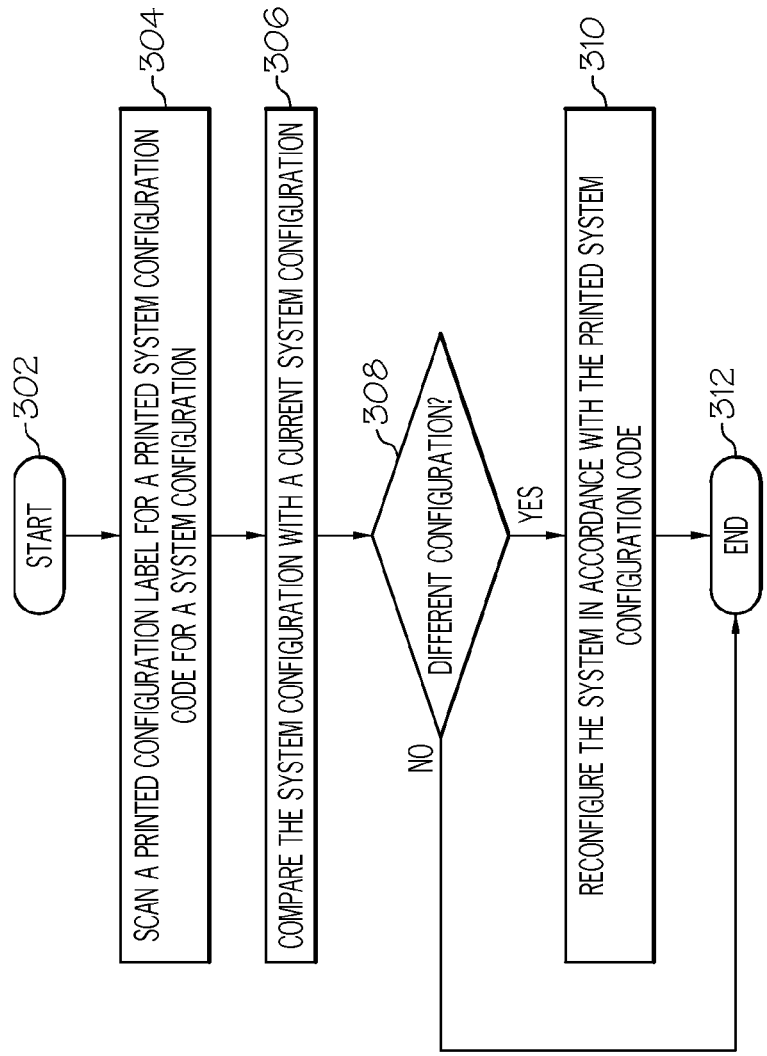
FIG. 3 is a high level flow chart of one or more exemplary steps performed by hardware logic to dynamically configure a computer system.

The computer 102 may utilize both volatile (e.g., RAM) and nonvolatile (e.g., EPROM) memory technologies. System memory 136 and Firmware Storage Device 156 may, at various times, contain data, system level firmware (such as Power On Self Test (POST) and Basic Input/Output System (BIOS)), device drivers, operating system kernels, virtual machine hypervisors, application programs, and the like (not all of which are illustrated in FIG. 1). In particular, system memory 136 or firmware storage device 156 may include a system configuration program (SCP) 148. In a preferred embodiment, the processes described in FIGS. 2-3 are executed during the boot process by using processor unit 104 with optical scanner 126, system memory 136, and code found in a firmware storage device 156. Firmware storage device 156 stores information used to dynamically configure computer 102 using configuration information read from the printed configuration label 154 by optical scanner 126. Firmware storage device 156 may be a silicon read only memory (ROM), a programmable read only memory (PROM or EPROM), an electrically erasable programmable read only memory (EEPROM), or any other type of static storage device. Alternatively, firmware storage device 156 may actually be a component of hard drive 134 and/or system memory 136. In a preferred embodiment, firmware storage device 156 comprises power on self test/basic input-output system (POST/BIOS) software used to boot up computer 102. Thus, optical scanner 126 is configured to be operational when the computer 102 is initially being booted up. In this embodiment, OS 138 and application programs 144 are not involved with reading configuration information from the printed configuration label 154. Rather, optical scanner 126 reads the printed configuration label 154 during POST/BIOS by utilizing routines found in firmware storage device 156, such that POST/BIOS is able to incorporate the read configuration information into the boot process. By requiring the POST/BIOS system to be run at startup, computer 102 can be certified as being compliant with whatever configuration information is described/defined by the printed configuration label 154. In an alternate embodiment from that described below, SCP 148 includes code for implementing some or all of the processes described below, including those described in FIGS. 2-3, after computer 102 has been booted up.

The boot up process described herein is preferably performed using processor unit 104 with optical scanner 126, system memory 136, and a firmware storage device 156. In an alternate embodiment, the functionality of processor unit 104 and firmware storage 156 are delegated to a service processor 158, which is a central processing unit (CPU), co-processor, etc. that is dedicated to management, maintenance, and monitoring tasks that include, but are not limited to, system configuration of computer 102. This system configuration may be performed during the boot process of computer 102, and uses the configuration information from the printed configuration label 154 described herein. The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

With reference now to FIGS. 2A-C, additional detail of computer 102, including the optical scanner 126, viewing window 152, and/or printed configuration label 154 shown in FIG. 1, is presented. In one embodiment, computer 102 is enclosed within a chassis enclosure 202. Similarly, in one embodiment, optical scanner 126 is wholly within the chassis enclosure 202, as depicted, while the printed configuration label 154 is affixed to the exterior of the chassis enclosure 202, preferably to viewing window 152. In the example shown in FIGS. 2A-C, viewing window 152 is composed of multiple openings (holes) through the chassis enclosure 202. In another embodiment, viewing window 152 may be a transparent or translucent material (e.g., transparent plastic/glass), a mesh screen, an open unobstructed hole, or any other configuration that will permit the optical scanner 126 to be in optical communication with a back side (facing towards the interior of the chassis enclosure 202) of the printed configuration label 154. Note that the printed information is preferably printed using ordinary, but permanent, ink. That is, in a preferred embodiment, information described in a printed system configuration code on the printed configuration label 154 is dependent on the relative darkness/lightness of the printed code. This dark/light pattern is detected by an array of optical emitters 204 emitting light, which bounces back and is detected by an array of optical sensors 206. As depicted, each pair of optical emitters/sensors 204/206 is aligned with a single hole in the viewing window 152.

The back side (facing the optical scanner 126) is printed with a printed system configuration code, which is preferably encoded. This printed system configuration code, when decoded, presents configuration information for the system configuration of computer 102. A processor (e.g., in processor unit 104) is able to dynamically configure computer 102 according to this configuration information that is decoded from the printed system configuration code. The front side (facing away from the chassis enclosure 202), contains a model (e.g., "Model 9999") or descriptor (e.g., "40 Watt Dual Core System") that describes how computer 102 will be configured in accordance with the printed system configuration code. The dark/light pattern of the printed system configuration code is preferably non-intuitive, such that a user cannot simply use a marker to create a counterfeit printed system configuration code. That is, by affixing the printed configuration label 154 to the viewing window 152, the computer will be configured (in a manner described below) according to the model/descriptor shown on the user-side of the printed configuration label 154.

Printed configuration label 154 may be one of a number of unique labels applied at the factory or it may be applied in the field, including the possibility of removing one label and affixing a different label. The printed configuration labels 154 may be completely preprinted (including front and back). Alternatively, the back side may allow for field customization by altering the reflective properties of areas of the back of the label.

The back side of the printed configuration label 154 may be white paper which is highly reflective until such time as a black marker is used on a specific area. Alternatively, the back of the printed configuration label 154 may be painted flat black and thus be non-reflective until such time as aluminized stickers are applied to specific areas to make them reflective.

In one embodiment, printed configuration label 154 is resistant to counterfeiting. Examples of methods used to resist such counterfeiting include, but are not limited to, using specially colored or impregnated (with foreign substances such as metals, etc.) inks that must be used in order to be recognized/decoded by the optical scanner 126; raised print (to overcome photocopy counterfeits); special label material (certain shine, dullness, etc. that is detectable by the optical scanner 126 as being legitimate or counterfeit), etc.

In any such configuration, the printed configuration labels 154 available to a user contain configuration coding that describe and/or limit an overall parameter of the computer 102. For example, assume that computer 102 is rated at 400 Watts. However, if most or all of the components (e.g., hard drive 134, system bus 106, I/O interface 116, network interface 130, etc.) of computer 102 are activated, computer 102 may exceed 400 Watts in total power consumption, thus exceeding the power rating of computer 102. However, there are several configurations for computer 102 that do not exceed the rated 400 Watts. For example, some of the processor cores may be turned off, bus speed can be reduced, the number of I/O ports can be reduced, peripherals can be turned off, etc. To ensure that the user does not exceed the safety limit of 400 Watts, only labels that so configure computer 102 (i.e., limit which components are activated/enabled) are delivered with the computer 102. In one embodiment, any attempt to override these conditions manually (e.g., by flipping dual in-line package (DIP) switches, reconfiguring wiring harnesses, etc.) will cause the machine to automatically shutdown. Similarly, any attempt to hack into SCP 148 or data in the firmware storage device 156 (shown in FIG. 1) to override these parameters will result in the computer 102 automatically shutting down.

As described above, in response to reading the encoded pattern from the label, the system may select a specific attribute, attribute set, mode of operation, or operational limit corresponding to the encoded pattern. For example, the system may choose to use a default world trade language in BIOS prompt, may choose to enable or disable certain subsystems, or may choose to limit processor speed (e.g., clock speed), power consumption, bus speed of an I/O bus and/or a system bus, network port settings, enablement settings of an I/O card, etc.

With reference now to FIG. 3, a high-level flow-chart of one or more exemplary steps performed by hardware logic to dynamically configure a computer system is presented. After initiator block 302, an optical scanner scans a printed configuration label for a printed system configuration code for a system configuration (block 304). The optical scanner may scan the back side of the printed configuration label, as described above, or it may scan the front of the printed configuration label, if the printed configuration label is applied to an interior surface of the chassis enclosure or another interior surface within the chassis enclosure.

Note that in a preferred embodiment, the optical scanner scans the printed configuration label at system start-up, such that information from the printed configuration label is used to initialize and boot the system. Thus, the system is reconfigured at every system start-up using the configuration information from the printed configuration label. This ensures that the system (e.g., computer 102) is configured within the parameters set by the printed configuration label, rather than those found in previously stored information in POST/BIOS, such that the system can be certified as complying with the parameters set by the printed configuration label.

However, in an alternate embodiment, the optical scanner scans the printed configuration label after the system has booted, thus enabling the system to be reconfigured "on the fly." Thus, as described in block 306, a processor compares the new system configuration with a current system configuration. Again, note that in one embodiment, the current system configuration is actually no configuration at all (since the system has not booted up), and the new system configuration is actually an initial configuration of the computer.

In response to the new system configuration and the current system configuration differing (query block 308), the processor, utilizing SCP 148 and/or instructions/rules/data from firmware storage device 156 shown in FIG. 1, reconfigures the system in accordance with the printed new system configuration code (block 308). Again, note that in one embodiment the printed configuration label is affixed to a viewing window in an enclosure of the system, wherein a first side of the label faces an interior of the enclosure for encrypted scanning by the optical scanner, and wherein the second side of the label faces away from the enclosure for unencrypted visual reading by a user. The process ends at terminator block 312.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A system comprising:
an optical scanner for reading a printed system configuration code;
a printed configuration label comprising the printed system configuration code, wherein the printed system configuration code describes a system configuration of the system, and wherein the system configuration comprises a bus speed of a system bus of the system; and
a processor for dynamically configuring the system according to configuration information decoded from the printed system configuration code.

2. The system of claim 1, further comprising:
a viewing window between the optical scanner and the printed configuration label, wherein, the printed configuration label is removably affixed to the viewing window.

3. The system of claim 2, wherein the optical scanner comprises at least one optical emitter and at least one optical sensor, and wherein the viewing window is within a chassis enclosure for the system.

4. The system of claim 3, wherein the at least one optical sensor is an array of optical sensors, wherein the viewing window is a series of openings through the chassis enclosure, wherein each of the openings matches a specific optical sensor from the array of optical sensors.

5. The system of claim 3, wherein the viewii window is a transparent opening through the chassis enclosure.

6. A system comprising:
an optical scanner for reading a printed system configuration code;
a printed configuration label comprising the printed system configuration code, wherein the printed system configuration code describes a system configuration of the system, wherein the system configuration comprises a bus speed of an input/output (I/O) bus of the system; and
a processor for dynamically configuring the system according to configuration information decoded from the printed system configuration code.

7. The system of claim 6, wherein the printed configuration label has two sides, wherein the first side faces the optical scanner and comprises the primed system configuration code, and wherein the second side comprises information, written in a human-readable language, that describes the system.

8. The system of claim 6, wherein the printed system configuration code is printed using a medium that is resistant to counterfeiting.

9. The system of claim 6, wherein the processor utilizes the printed system configuration code to dynamically configure the system every time the system boots up.

10. The system of claim 6, wherein the system configuration further comprises a human language setting for the system.

11. A system comprising:
an optical scanner lbr reading a printed system configuration code;
a printed configuration label comprising the printed system configuration code, wherein the printed system configuration code describes a system configuration of the system, wherein the system configuration comprises a network port setting of the system, and wherein the system configuration further comprises adjusting components of the system such that a maximum power rating of the system is not exceeded; and
a processor for dynamically configuring the system according to configuration information decoded from the printed system configuration code.

12. The system of claim 11, wherein the printed configuration label is affixed to a chassis enclosure of the system, and wherein the printed system configuration code is rendered permanently unreadable if the printed configuration label is removed from the chassis enclosure of the system.

13. The system of claim 11, further comprising:
a viewing window between the optical scanner and the printed configuration label, wherein the printed configuration label is removably affixed to the viewing window.

14. The system of claim 13, wherein the optical scanner comprises at least one optical emitter and at least one optical sensor, and wherein the viewing window is within a chassis enclosure for the system.

15. A system comprising:
an optical scanner for reading a printed, system configuration code;
a printed configuration label comprising the printed system configuration code, wherein the printed system configuration code describes a system configuration of the system, and wherein the system configuration comprises an enablement setting of an input/output (I/O) card of the system; and
a processor for dynamically configuring the system according to configuration information decoded from the printed system configuration code.

16. The system of claim 15, further comprising:
a viewing window between the optical scanner and the printed configuration label, wherein the printed configuration label is removably affixed to the viewing window.

17. The system of claim 16, wherein the optical scanner comprises at least one optical emitter and at least one optical sensor, and wherein the viewing window is within a chassis enclosure for the system.

18. The system of claim 17, wherein the at least one optical sensor is an array of optical sensors, wherein the viewing window is a series of openings through the chassis enclosure, wherein each of the openings matches a specific optical sensor from the array of optical sensors.

19. The system of claim 17, wherein the viewing window is a transparent opening through the chassis enclosure.

* * * * *